(12) United States Patent
Nishigaki et al.

(10) Patent No.: US 10,395,828 B2
(45) Date of Patent: Aug. 27, 2019

(54) CAPACITOR

(71) Applicant: KYOCERA Corporation, Kyoto-shi, Kyoto (JP)

(72) Inventors: Masahiro Nishigaki, Kirishima (JP); Hideyuki Osuzu, Kirishima (JP); Jun Ueno, Kirishima (JP); Masaaki Nagoya, Kirishima (JP); Shota Mukoyama, Kirishima (JP)

(73) Assignee: KYOCERA Corporation, Kyoto-Shi, Kyoto (JP)

( * ) Notice: Subject to any disclaimer, the term of this patent is extended or adjusted under 35 U.S.C. 154(b) by 0 days.

(21) Appl. No.: 15/771,013

(22) PCT Filed: Oct. 26, 2016

(86) PCT No.: PCT/JP2016/081740
§ 371 (c)(1),
(2) Date: Apr. 25, 2018

(87) PCT Pub. No.: WO2017/073621
PCT Pub. Date: May 4, 2017

(65) Prior Publication Data
US 2018/0308637 A1    Oct. 25, 2018

(30) Foreign Application Priority Data

Oct. 28, 2015 (JP) .................................. 2015-211974
Feb. 24, 2016 (JP) .................................. 2016-033290
(Continued)

(51) Int. Cl.
*H01G 4/12* (2006.01)
*C04B 35/468* (2006.01)
(Continued)

(52) U.S. Cl.
CPC ....... *H01G 4/1227* (2013.01); *C04B 35/4682* (2013.01); *C04B 35/6261* (2013.01);
(Continued)

(58) Field of Classification Search
CPC .......... H01G 4/06; H01G 4/008; H01G 4/012; H01G 4/12; H01G 4/30; H01G 4/232; H01G 4/1227; H01G 4/248
See application file for complete search history.

(56) References Cited

U.S. PATENT DOCUMENTS

2006/0023399 A1* 2/2006 Fujioka .................. B32B 18/00
361/321.2
2006/0114641 A1* 6/2006 Iwasaki ................ H01G 4/1227
361/321.4
(Continued)

FOREIGN PATENT DOCUMENTS

CN    101542658 A    9/2009
CN    102007557 A    4/2011
(Continued)

OTHER PUBLICATIONS

International Search Report (Form PCT/ISA/210) dated Jan. 17, 2017, issued in PCT/JP2016/081740.
(Continued)

*Primary Examiner* — Nguyen T Ha
(74) *Attorney, Agent, or Firm* — Volpe and Koenig, P.C.

(57) ABSTRACT

The dielectric layers are formed from a dielectric porcelain formed from crystal particles containing barium titanate as a main component and containing a rare earth element, and the crystal particles have, in a particle boundary vicinity, a low concentration region in which the concentration of the rare earth element is lower than the concentration of the rare earth element in an inside. The crystal particles further contain vanadium, and the low concentration region con-
(Continued)

tains a larger amount of the vanadium than the amount of the vanadium in the inside. The crystal particles further contain magnesium and manganese, and the magnesium and the manganese have a concentration gradient that is at a maximum at the particle boundary vicinity and that lowers toward the inside.

8 Claims, 4 Drawing Sheets

(30) Foreign Application Priority Data

| Jun. 28, 2016 | (JP) | ................................ 2016-127762 |
| Jul. 26, 2016 | (JP) | ................................ 2016-146447 |

(51) Int. Cl.

| C04B 35/626 | (2006.01) |
| C04B 35/63 | (2006.01) |
| C04B 35/634 | (2006.01) |
| C04B 35/638 | (2006.01) |
| C04B 35/64 | (2006.01) |
| C04B 41/00 | (2006.01) |
| C04B 41/45 | (2006.01) |
| C04B 41/51 | (2006.01) |
| C04B 41/88 | (2006.01) |
| H01G 4/232 | (2006.01) |
| H01G 4/30 | (2006.01) |
| H01G 4/248 | (2006.01) |

(52) U.S. Cl.
CPC ...... *C04B 35/6264* (2013.01); *C04B 35/6303* (2013.01); *C04B 35/638* (2013.01); *C04B 35/6342* (2013.01); *C04B 35/64* (2013.01); *C04B 41/009* (2013.01); *C04B 41/4578* (2013.01); *C04B 41/5144* (2013.01); *C04B 41/88* (2013.01); *H01G 4/232* (2013.01); C04B 2235/3206 (2013.01); C04B 2235/3208 (2013.01); *C04B 2235/3224* (2013.01); *C04B 2235/3236* (2013.01); *C04B 2235/3239* (2013.01); *C04B 2235/3262* (2013.01); *C04B 2235/36* (2013.01); *C04B 2235/5445* (2013.01); *C04B 2235/5454* (2013.01); *C04B 2235/6025* (2013.01); *C04B 2235/6562* (2013.01); *C04B 2235/6582* (2013.01); *C04B 2235/663* (2013.01); *C04B 2235/72* (2013.01); *C04B 2235/785* (2013.01); *C04B 2235/79* (2013.01); *C04B 2235/85* (2013.01); *H01G 4/248* (2013.01); *H01G 4/30* (2013.01)

(56) References Cited

U.S. PATENT DOCUMENTS

| 2009/0059471 | A1* | 3/2009 | Fukuda | ................ H01G 4/1227 |
| | | | | 361/321.4 |
| 2009/0073635 | A1* | 3/2009 | Taniguchi | ........... C04B 35/4682 |
| | | | | 361/321.4 |
| 2010/0067171 | A1* | 3/2010 | Yamazaki | ........... C04B 35/4682 |
| | | | | 361/321.4 |
| 2015/0036262 | A1* | 2/2015 | Kai | ...................... H01G 4/1209 |
| | | | | 361/301.4 |
| 2017/0178812 | A1* | 6/2017 | Shimada | .................. H01G 4/30 |

FOREIGN PATENT DOCUMENTS

| JP | 2001-230150 A | | 8/2001 |
| JP | 2008-239407 A | | 10/2008 |
| JP | 2012-094696 | * | 5/2012 |
| JP | 2012-94696 A | | 5/2012 |
| JP | 2014-84267 A | | 5/2014 |

OTHER PUBLICATIONS

Written Opinion (Form PCT/ISA/237) dated Jan. 17, 2017, issued in PCT/JP2016/081740.

* cited by examiner

CONCENTRATION OF
RARE EARTH ELEMENT
(Arb. Unit)

GRAIN BOUNDARY                    INSIDE

FIG. 4A
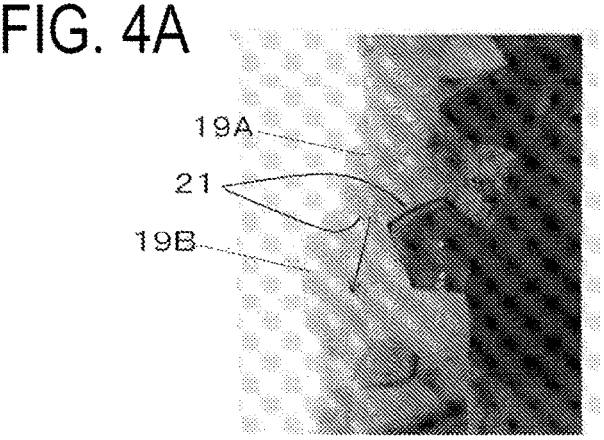
FIG. 4B
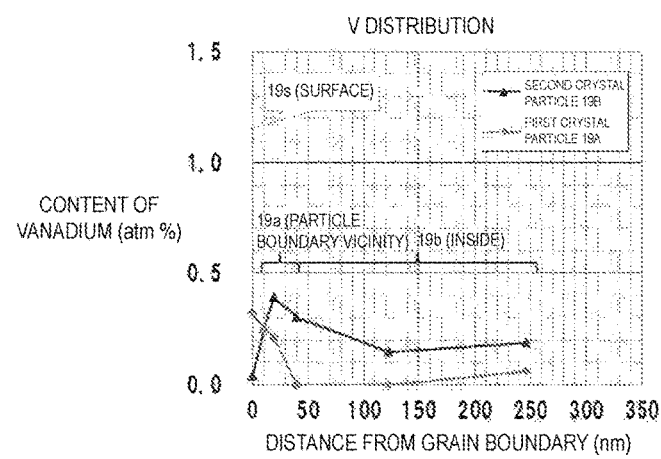
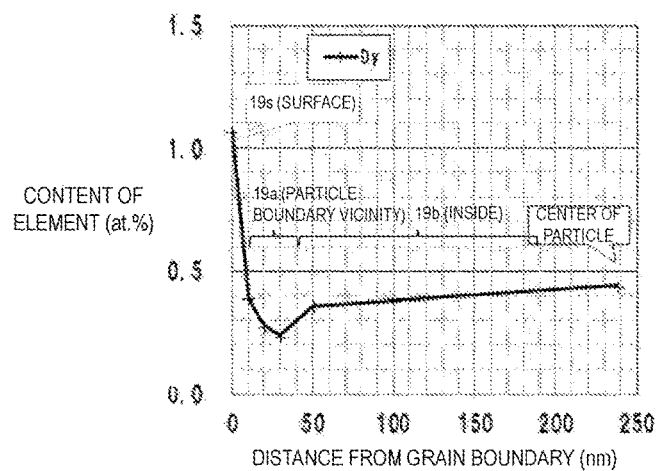
FIG. 5

CAPACITOR

TECHNICAL FIELD

The present disclosure relates to a capacitor.

BACKGROUND ART

In recent years, electronic equipment such as cellular phones has been made smaller and has an even higher packaging density, and it has been desired for capacitors such as multilayer ceramic capacitors to be smaller and have even higher packaging density (e.g. see Patent Documents 1 and 2).

CITATION LIST

Patent Literature

Patent Document 1: JP 2001-230150 A
Patent Document 2: JP 2008-239407 A

SUMMARY OF INVENTION

The capacitor of the present disclosure is a multilayer ceramic capacitor including a capacitor body in which a plurality of dielectric layers and internal electrode layers are laminated alternately, and an external electrode provided on an end surface where the internal electrode layer of the capacitor body is exposed. The dielectric layers are formed from a dielectric porcelain formed from crystal particles containing barium titanate as a main component and containing a rare earth element, and the crystal particles have, in a particle boundary vicinity, a low concentration region in which a concentration of the rare earth element is lower than a concentration of the rare earth element in an inside.

BRIEF DESCRIPTION OF DRAWINGS

FIG. 4A is a photograph of a part of a cross-section of a dielectric layer constituting a capacitor of a second embodiment taken by using a transmission electron microscope, and FIG. 4B is elemental analysis data of vanadium in a range indicated by the arrow shown in the photograph of FIG. 4A.

FIG. 5 is elemental analysis data of a rare earth element in a range indicated by the arrow shown in the photograph of FIG. 4A.

DESCRIPTION OF EMBODIMENTS

First Embodiment

The capacitor of the present disclosure is described based on a multilayer ceramic capacitor illustrated as an example in FIGS. 1A and 1B and FIGS. 2A and 2B. The multilayer ceramic capacitor will be referred to simply as a "capacitor" hereinafter.

Figure 1A:
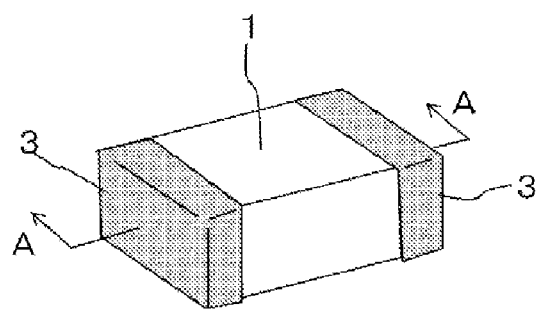
FIG. 1A is a perspective view illustrating a capacitor according to a first embodiment.
Figure 1B:
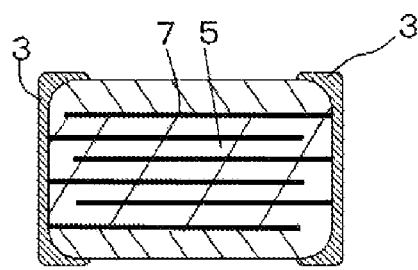
FIG. 1B is a cross-sectional view of FIG. 1A.
Figure 2A:
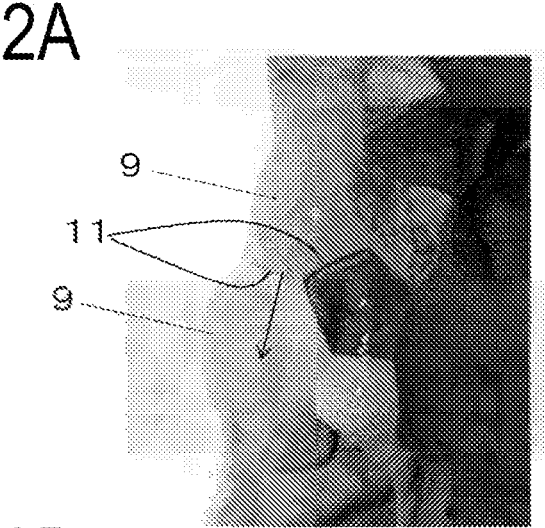
FIG. 2A is a photograph of a part of a cross-section of a dielectric porcelain taken by using a transmission electron microscope.
Figure 2B:
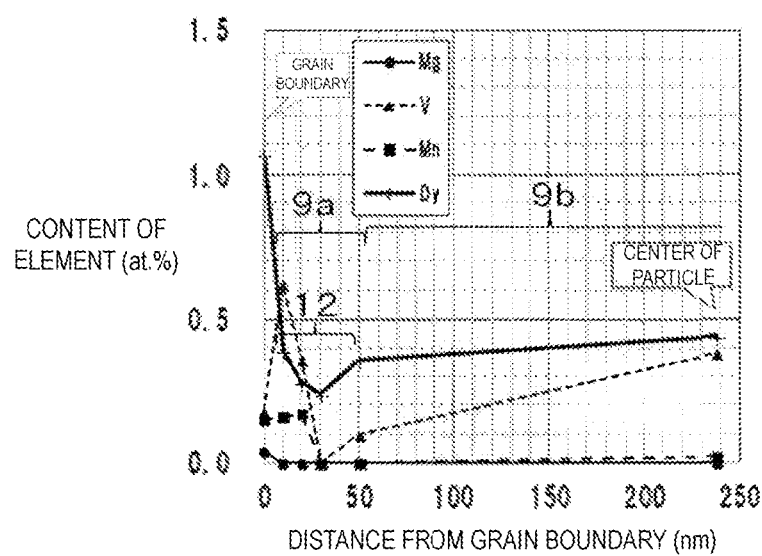
FIG. 2B is elemental analysis data in a range indicated by the arrow shown in the photograph of FIG. 2A.

FIG. 1A is a perspective view illustrating a capacitor according to a first embodiment, and FIG. 1B is a cross-sectional view of FIG. 1A. FIG. 2A is a photograph of a part of a cross-section of a dielectric layer constituting a capacitor of the first embodiment taken using a transmission electron microscope, and FIG. 2B is elemental analysis data in a range indicated by the arrows shown in the photograph of FIG. 2A.

This capacitor of the first embodiment includes external electrodes 3 provided on both end portions of the capacitor body 1. The capacitor body 1 is formed by alternately laminating a plurality of dielectric layers 5 formed from a dielectric porcelain and internal electrode layers 7. FIGS. 1A and 1B illustrate the laminate condition of the dielectric layers 5 and the internal electrode layers 7 simplistically. This capacitor is a laminate having several hundreds of layers of the dielectric layers 5 and the internal electrode layers 7. The dielectric layers 5 are formed from dielectric porcelain and are composed of crystal particles 9 and grain boundaries 11. In this case, the crystal particle 9 constituting the dielectric layer 5 of the capacitor of the first embodiment contains barium titanate as a main component, and this crystal particle contains a rare earth element.

The condition where the crystal particle 9 having barium titanate as a main component contains the rare earth element refers to, for example, the condition where X-rays indicating the rare earth element are detected when qualitative analysis is performed for crystal particles that are discretionary chosen from the cross-section of the dielectric layers 5 (the number is from 10 to 30 particles) by using a method of applying an electron beam to each of the crystal particles 9. In the dielectric layers 5 (dielectric porcelain) constituting the capacitor of the first embodiment, crystal particles 9 in which the rare earth element is detected are contained in a proportion, in terms of the number of particles, of 90% or greater.

In the crystal particle 9 constituting the dielectric layer 5 of the capacitor of the first embodiment, a part having a less content of the rare earth element is formed in the region close to the grain boundary 11. That is, the crystal particle 9 has, in a particle boundary vicinity 9a, a low concentration region 12 having a lower concentration of the rare earth element than the concentration of the rare earth element in an inside 9b.

Note that the particle boundary vicinity 9a is a region that is located approximately 10 to 60 nm toward the inside 9b side from the surface of the crystal particle 9. A part that is located on an inner side of the particle boundary vicinity 9a is referred to as the inside 9b. The boundary between the particle boundary vicinity 9a and the inside 9b may be defined by using inflection points at which the change in the concentration of the rare earth element is gradual in a region that is located approximately 40 to 80 nm toward the inside 9b side from the surface of the crystal particles 9, as the boundary.

Herein, the crystal particles 9 constituting the dielectric layers 5 of the capacitor of the first embodiment are compared with crystal particles constituting dielectric layers of a known capacitor.

Figure 3A:
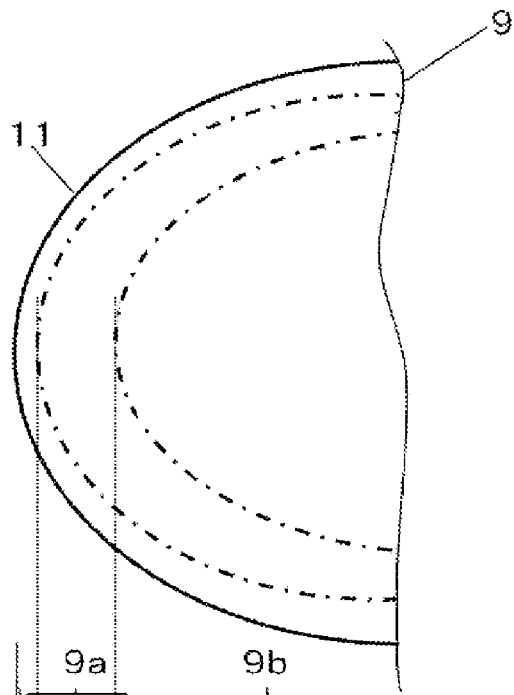
FIG. 3A is a cross-sectional view schematically illustrating approximately a half of a crystal particle constituting the dielectric layer of the capacitor of the first embodiment.
Figure 3B:
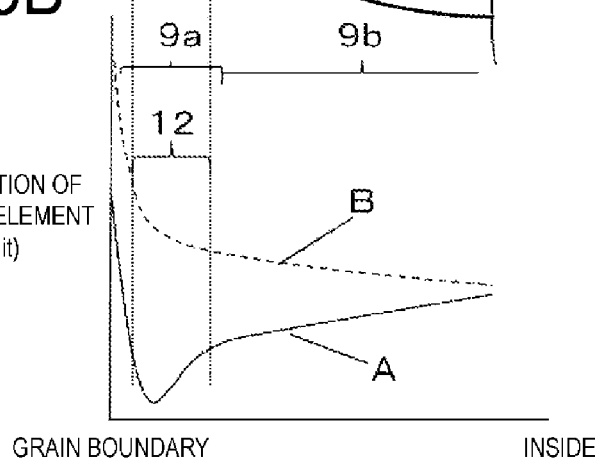
FIG. 3B is a graph schematically showing the change in concentration of a rare earth element in the crystal particle of FIG. 3A.

FIG. 3A is a cross-sectional view schematically illustrating approximately a half of a crystal particle constituting the dielectric layer of the capacitor of the first embodiment, and FIG. 3B is a graph schematically showing the change in concentration of a rare earth element in the crystal particle of FIG. 3A. Herein, the curve A corresponds to the crystal particles 9 constituting the dielectric layers 5 of the capacitor of the first embodiment, and the curve B corresponds to crystal particles constituting dielectric layers of a known capacitor.

In FIG. 3B, the vertical axis has a discretionary unit. In this case, in FIG. 3B, the curve B is shown by shifting the curve B above the curve A. This is to make the changes of concentrations of the rare earth element clear when the two curves are shown on the diagram.

The curve A shows that the concentration of the rare earth element tends to decrease once from the grain boundary 11 toward the inner side of the crystal particles 9 and then tends to increase again on the side of the inside 9b.

On the other hand, the curve B shows that the concentration of the rare earth element tends to decrease from the grain boundary to the inside of the crystal particle. The curve B corresponds to, for example, crystal particles having a core-shell structure described in Patent Document 1 described above.

In the crystal particles 9 of the capacitor of the first embodiment, as shown in FIG. 2B, a part having a concentration of the rare earth element lower than the concentration of the rare earth element in the inside 9b is formed in a particle boundary vicinity 9a (low concentration region 12). The low concentration region 12 refers to a region where the concentration of the rare earth element is 0.8 or less when the concentration of the rare earth element in the center of the crystal particle 9 is assigned a value of 1.

As is clear from FIG. 3B, when the curve A corresponding to the crystal particles 9 of the capacitor of the first embodiment and the curve B corresponding to crystal particles of a known capacitor are compared, the difference in concentrations of the rare earth element in the region defined as the low concentration region 12 of the curve A is significantly large.

In the dielectric porcelain containing barium titanate as a main component, to enhance insulating property by controlling relative permittivity and temperature characteristics of the relative permittivity, typically, a plurality of elements such as rare earth elements needs to be added and these elements need to be formed into a solid solution in the crystal particles 9. When the additive component is formed into a solid solution in the crystal particles 9, the crystalline structure of the crystal particles 9 is changed. In the case of barium titanate, when the additive component is not contained, the crystalline structure is the tetragonal system. When the additive component is formed into a solid solution in this, the crystalline structure changes from the tetragonal system to the cubic system. Along with this change in the crystalline structure, the dielectric porcelain exhibits tendency in which the relative permittivity decreases.

As is clear from the comparison between the curve A and the curve B shown in FIG. 3B, in the crystal particles 9 of the capacitor of the first embodiment shown as the curve A, a region where the content of the rare earth element is low is formed around the grain boundary where the concentration of the rare earth element is typically high. As a result, the crystal particle 9 partially maintains the crystalline structure of the tetragonal system, and thus the crystal particle 9 exhibits a high relative permittivity. Because of this, a capacitor having a high electrostatic capacitance can be obtained.

Note that, when the crystalline structure of the dielectric porcelain containing the crystal particles 9 exhibiting such a change in the concentration of the rare earth element is evaluated, such dielectric porcelain exhibits a crystalline structure in which barium titanate having the tetragonal system and the barium titanate having the cubic system coexist. Because of this, the crystal particle 9 of the capacitor of the first embodiment has a so-called core-shell structure between the particle boundary vicinity 12 and the inside 9b of the crystal particle 9, and thus a capacitor having an even higher insulating property can be obtained.

Furthermore, when the change in the concentration of the rare earth element contained in the crystal particle 9 is as shown by the curve A of FIG. 3B, another additive component such as vanadium can be contained locally in the particle boundary vicinity 9a where the concentration of the rare earth element is low. This condition is shown in FIG. 2B and, in this case, a region with the highest concentration of vanadium exists in the particle boundary vicinity 12. The concentrations of vanadium in the grain boundary 11 and the inside 9b are lower than the highest concentration in the particle boundary vicinity 12. When the change in the concentrations of the rare earth element and vanadium contained in the crystal particle 9 is as shown in FIG. 2B, insulation reliability (high-temperature load life) of the capacitor can be enhanced together with the relative permittivity of the dielectric porcelain.

Furthermore, as shown in FIG. 2B, in the crystal particle 9, even when other elements (magnesium, manganese, and the like) are further added to the dielectric porcelain, these elements tend to remain in the particle boundary vicinity 12 (a region that is at most ½ of the width of the particle boundary vicinity 12) of the crystal particle 9. Because of this, transformation to the cubic system is suppressed in the crystal particle 9. Therefore, a dielectric porcelain with small temperature-change rate of relative permittivity can be obtained by the crystal particle 9 while a high relative permittivity is maintained.

Herein, as is clear from FIG. 2B, the crystal particle 9 is in a condition by which elements such as vanadium, manganese, and magnesium are less likely to exist overlapped each other in terms of concentration in the region containing the rare earth element. Therefore, a condition with less defects is formed in the crystal particle 9. As a result, the variation of withstand voltage of the capacitor of the first embodiment becomes smaller, and yield in the production becomes higher.

As described below, the capacitor of the first embodiment can be obtained by firing a green compact to be the capacitor body 1 in a condition where the temperature elevation rate is high to diffuse a plurality of elements such as the rare earth elements in the crystal particles 9, and then heat-treating the fired compact so that the plurality of elements such as the rare earth elements that are diffused into the crystal particles 9 is removed from the surface part of the crystal particles to the outside of the crystal particles 9 by performing reoxidation treatment for a long period of time.

Furthermore, in this capacitor, in addition to the crystal particles 9 containing barium titanate as the main component (no calcium is contained) described above (hereinafter, also referred to as "crystal particles containing no calcium"), for example, the dielectric layers 5 may contain crystal particles containing calcium (hereinafter, also referred to as "crystal particles containing calcium") as second crystal particles in addition to the crystal particles 9 containing barium titanate as the main component. Alternatively, the dielectric layers 5 may be composed of crystal particles containing calcium.

Note that the crystal particles containing calcium are crystal particles in which a trace amount of calcium (Ca) is dissolved to form a solid solution in barium titanate and which maintain a perovskite structure in the same manner as in the crystal particles containing no calcium even when the calcium is dissolved to form a solid solution in the crystal particles 9. In this case, the concentration of the calcium contained in the crystal particles 9 is preferably from 0.4 to 1 at. % from the perspective of enhancing the dielectric characteristics while the perovskite structure is maintained.

On the other hand, "crystal particles containing no calcium" refers to the condition where calcium is substantially not contained. In this case, the concentration of the calcium is 0.1 at. % or less.

Furthermore, the calcium contained in the crystal particles 9 is preferably uniformly distributed in the crystal particles 9. The crystal particles 9 in which the calcium is uniformly distributed can be formed by using powder, in which calcium is dissolved to form a solid solution, in barium titanate powder in the stage of raw material powder. Such raw material powder can be obtained by a synthesis method of using a mixed solution containing components including barium, titanium, and calcium as a starting raw material.

When the crystal particles containing calcium coexist with the crystal particles containing no calcium in the dielectric layers 5, withstand voltage can be enhanced together with relative permittivity while dielectric loss is suppressed.

In this case, because the relative permittivity and the withstand voltage can be further increased, the average particle size of the crystal particles containing calcium is preferably greater than the average particle size of the crystal particles containing no calcium.

Furthermore, the proportion of the crystal particles containing calcium contained in the dielectric layers 5 is preferably from 0.7 to 0.9 when the total amount of the crystal particles containing calcium and the crystal particles containing no calcium is assigned a value of 1.

Note that the proportion of the crystal particles containing calcium is determined as described below. For example, analysis is performed by deciding a predetermined region of a cross-section of the dielectric layers 5 by using an analyzer attached to a transmission electron microscope. The proportion of area of the crystal particles containing calcium contained in the crystal particles 9 observed at this time is determined. In this case, for the determination of presence or absence of calcium in the crystal particles 9, analysis is performed by deciding a predetermined region of a cross-section of the dielectric layers 5 by using an analyzer attached to a transmission electron microscope.

Note that when the dielectric layers 5 are analyzed by the method described above, the crystal particles containing no calcium are crystal particles having the calcium concentration of 0.1 at. % or less. On the other hand, the crystal particles containing calcium are crystal particles having the calcium concentration of 0.4 at. % or greater.

The condition where the crystal particle having barium titanate as a main component contains the calcium refers to the condition where X-rays indicating the calcium is detected when qualitative analysis is performed by a method of applying an electron beam to the crystal particles. In the dielectric layers 5 formed from the crystal particles containing calcium, crystal particles in which the X-rays indicating calcium are detected are contained in a proportion, in terms of the number of particles, of 90% or greater when a qualitative analysis is performed for crystal particles that are discretionary chosen (the number is from 10 to 30 particles) by using a method of applying an electron beam to each of the crystal particles.

Second Embodiment

A capacitor according to the second embodiment will be described next. FIG. 4A is a photograph of a part of a cross-section of a dielectric layer constituting the capacitor of the second embodiment taken by using a transmission electron microscope, and FIG. 4B is elemental analysis data of vanadium in a range indicated by the arrow shown in the photograph of FIG. 4A. The capacitor of the second embodiment has the same configuration as that of the capacitor of the first embodiment illustrated in FIGS. 1A and 1B regarding the laminate condition of the dielectric layers and the internal electrode layers, as well as the same appearance.

Note that the capacitor of the second embodiment has the following characteristics in addition to the characteristics of the crystal particles 9 of the capacitor of the first embodiment. That is, in the case of the capacitor of the first embodiment, the crystal particle 9 has, in a particle boundary vicinity 9a, a low concentration region 12 having a lower concentration of the rare earth element than a concentration of the rare earth element in an inside 9b. In the capacitor of the second embodiment, in addition to this, the crystal particles 19 are formed from crystal particles 19 with different change in the concentration of vanadium.

Also, in the case of the crystal particles 19 constituting the dielectric layers 5 of the capacitor of the second embodiment, as illustrated in FIG. 4B, a surface 19s of the crystal particle 19 is a grain boundary 21, and the region that is located a little inward from the grain boundary 21 is a particle boundary vicinity 19a. The region located on an inner side of the particle boundary vicinity 19a is defined as an inside 19b.

When the crystal particles 19 are divided into two regions as described above, the crystal particles 19 are composed of first crystal particles 19A in which the concentration of vanadium is at a maximum in the surface 19s, and second crystal particles 19B in which the concentration of vanadium is at a maximum in the particle boundary vicinity 19a that is located inward from the surface 19s. That is, the crystal particles 19 are composed of two types, crystal particles 19A and 19B, that have different changes of the concentrations of vanadium.

In this case, the first crystal particle 19A has the concentration of vanadium of 0.1 at. % or less in the internal region that is located in the depth from the surface 19s of 40 nm or greater as shown in FIG. 4B. On the other hand, while the second crystal particle 19B has the concentration of vanadium of 0.1 at. % or less in the surface 19s, the second crystal particle 19B has the concentration of vanadium of 0.15 at. % or greater even in the internal region that is located in the depth from the surface 19s of 40 nm or greater.

Note that the surface 19s of the second crystal particle 19B includes a region including 5 nm inward from the surface 19s of the crystal particle 19 taking the spot size of the electron beam used in the measurement of concentration of element into account. On the other hand, the particle boundary vicinity 19a of the crystal particle 19 is in a range of ±15 nm from a center position when the point at which the concentration of vanadium is at the maximum value in the region located inward at 10 nm or greater from the surface 19s of the crystal particle 19 (second crystal particle 19B) is taken to be the center position.

The capacitor of the second embodiment containing two types of crystal particles 19A and crystal particles 19B, that have different changes of the concentrations of vanadium exhibits change in the following characteristics according to Examples described below. When the crystal particles 19 constituting the dielectric layers 5 have a configuration in which the first crystal particles 19A and the second crystal particles 19B coexist and the proportion of the first crystal particles 19A is increased, high insulation resistance of the capacitor is achieved. On the other hand, when the proportion of the second crystal particles 19B is increased, change is made smaller when insulation resistance is measured for a long period of time in high-temperature load life test although the insulation resistance of the capacitor is decreased. Because of this, a longer high-temperature load life is achieved.

From these results, as the crystal particles 19 constituting the dielectric layers 5, by setting the proportion of coexistence of the first crystal particles 19A and the second crystal particles 19B to a particular range, a capacitor having a high electrostatic capacitance and excellent long-term reliability can be obtained.

In this case, when the insulation resistance, electrostatic capacitance, and high-temperature load life are indicated by an overall evaluation value (performance index described below), in the case where the number of the first crystal particles 19A observed on a polished surface of the dielectric porcelain is N1 and the number of the second crystal particles 19B is N2, N2/(N1+N2) is preferably from 0.3 to 0.8, and particularly from 0.5 to 0.8. N1/(N1+N2) is from 0.2 to 0.7.

When the proportion of the first crystal particles 19A and the second crystal particles 19B is determined in terms of the proportion of the number described above, a scanning electron microscope or a transmission electron microscope (hereinafter, also referred to as "electron microscope") is used.

At this time, the spot size of the electron beam is from 2 to 5 nm. Furthermore, the positions that are subjected to the analysis are 4 to 5 positions chosen on a straight line from the side of the grain boundary 21, the straight line being drawn from the surface 19s to the center of the crystal particle 19. The concentration of vanadium detected from each measurement point is determined and plotted as shown in FIG. 4B. Such analysis is performed for approximately 20 to 40 particles of the crystal particles 19. The first crystal particles 19A and the second crystal particles 19B are determined from the difference in the changes of concentrations of vanadium, and then the number of each of the crystal particles is determined.

FIG. 5 is elemental analysis data of a rare earth element in a range indicated by the arrow shown in the photograph of FIG. 4A.

The capacitor of the second embodiment contains not only the vanadium but also other elements such as rare earth elements as described above. In this case, when the elements contained in the crystal particles 19 are rare earth elements, the rare earth elements are preferably contained under a condition where the concentration of vanadium is minimum at the maximum concentration region (reference sign 19a) in the second crystal particles 19B.

If a condition in which the concentration of the rare earth elements becomes high in the region having the high concentration of vanadium (reference sign 19a) when the rare earth element is dissolved to form a solid solution in the second crystal particle 19B, there will be a large amount of rare earth elements that cannot be completely dissolved to form a solid solution in the second crystal particle 19B. The defects (lattice defects) caused by such excessive amounts of rare earth elements become carriers and tend to cause decrease in dielectric characteristics.

On the other hand, in the case of the capacitor of the second embodiment, the concentration of the rare earth elements is at a minimum in the region having the high concentration of vanadium (reference sign 19a) in the second crystal particles 19B. Thus, the vanadium and the rare earth elements are less likely to exist overlapped each other in terms of concentration. Because of this, defects are less likely to occur in the second crystal particles 19B, and dielectric characteristics under a condition where a voltage is applied, such as bias characteristics and high-temperature load life, can be enhanced. In this case, the region at which the concentration of vanadium is at a maximum is preferably in the region where the concentration of rare earth elements is at a minimum.

Furthermore, also in this capacitor of the second embodiment, when another element (such as magnesium and manganese) is further added in the dielectric layer 5, these elements tend to remain in the particle boundary vicinity 19a of the second crystal particle 9B. Because of this, the concentrations of magnesium and manganese are maximum at the surface 19s, and the second crystal particle 19B tends to maintain the core-shell structure. As a result, transformation to the cubic system is suppressed in the crystal particle 19. Therefore, from the dielectric layers 5 containing a large amount of the second crystal particles 19B, a capacitor having excellent bias characteristics can be obtained while high insulating property is maintained.

Furthermore, in the capacitor of the second embodiment, the dielectric layers 5 may contain crystal particles 9 other than the first crystal particles 9A and the second crystal particles 9B as long as the dielectric characteristics are not significantly reduced. Examples thereof include crystal particles such that the change in concentration of vanadium is constant from the surface 19s to the center portion of the crystal particle 19. Preferably, the proportion of such crystal particles does not exceed 5% in terms of the proportion of the number.

The dielectric layers 5 constituting the capacitor of the second embodiment can be obtained by using a green sheet described below. For example, as the barium titanate powder which is the main raw material, a barium titanate powder having a normal distribution or a particle size distribution that is close to the normal distribution is used. To this barium titanate powder, a vanadium pentoxide powder is added. Furthermore, the temperature elevation rate for firing a green compact to be the capacitor body 1 is increased. This is because firing at a high temperature elevation rate tends to cause a condition where vanadium is dissolved to form a solid solution in the middle of the inside of the crystal particle 19 as well as because the degree of formation of a solid solution of the vanadium differs depending on the difference in the particle size of the barium titanate powder.

The first crystal particle 19A in which the concentration of vanadium is at a maximum at the surface 19s of the crystal particle 19 is formed from a barium titanate powder having a larger particle size. On the other hand, the second crystal particle 9B having a maximum concentration region in which the concentration of vanadium is at a maximum in the particle boundary vicinity 19a located on the inner side from the surface 19s of the crystal particle 19 is formed from a barium titanate powder having a smaller particle size.

Furthermore, in this capacitor of the second embodiment, the dielectric layers 5 may contain crystal particles containing calcium in place of the crystal particles 9 containing barium titanate as the main component (no calcium is contained) described above (hereinafter, also referred to as "crystal particles containing no calcium").

Even in the capacitor of the second embodiment, when the dielectric layers 5 are formed from the crystal particles containing calcium, high electrostatic capacitance of the capacitor can be achieved, and insulation resistance and high-temperature load life can be enhanced compared to the case of the crystal particles 9 containing no calcium.

Note that, when the dielectric layers 5 of the capacitor of the second embodiment contains the crystal particles containing calcium, the proportion of the number of the first crystal particles 19A and the second crystal particles 19B constituting the dielectric layers 5 (N2/N1+N2) is preferably from 0.3 to 0.8, and particularly preferably from 0.5 to 0.8, similarly to the case of the dielectric layers 5 containing no crystal particles containing calcium described above.

As the composition of the dielectric porcelain constituting the dielectric layers 5 that can realize a capacitor of the first and second embodiments, the following ranges are preferable: per 100 mol of barium titanate which is the main component, from 0.04 to 0.10 mol of vanadium in terms of $V_2O_5$, from 0.5 to 1.2 mol of magnesium in terms of MgO, from 0.1 to 0.5 mol of at least one type of rare earth element (RE) selected from the group consisting of yttrium, dysprosium, holmium, terbium, and ytterbium in terms of $RE_2O_3$, and from 0.05 to 0.4 mol of manganese in terms of MnO.

Furthermore, the average particle size of the crystal particles 9 constituting the dielectric layers 5 of the capacitors of the first and second embodiments is preferably from 0.1 to 0.5 μm. Furthermore, the average thickness of the dielectric layers 5 is preferably from 0.3 to 2 μm. The internal electrode layer 7 is preferably nickel (Ni) from the perspective of suppressing the production cost even when the number of layers to be stacked is increased and enabling simultaneous firing with the dielectric layers 5.

EXAMPLES

Example 1

Hereinafter, evaluations of dielectric characteristics were performed by specifically producing a capacitor of the first embodiment. First, as the raw material powder, a barium titanate powder having a purity of 99.9% and having a molar ratio of Ba/Ti of 1.005 (shown as BT in Table 1) and a barium titanate powder containing 0.5 at. % of calcium and having a molar ratio of (Ba+Ca)/Ti of 1.005 (shown as BCT in Table 1) were prepared, and a dielectric powder was prepared by adding components described below to the raw material powder. As the raw material powder, raw material powders having the average particle sizes of 0.2 μm were used.

The composition of the dielectric powder contained, per 100 mol of the barium titanate powder, 0.05 mol of $V_2O_5$ powder, 0.7 mol of MgO powder, 0.4 mol of oxide powder of rare earth element ($Dy_2O_3$), and 0.2 mol of $MnCO_3$ powder, and 1 part by mass of a sintering aid (glass powder having the following composition: $SiO_2=55$, BaO=20, CaO=15, $Li_2O=10$ (mol %)) was added to 100 parts by mass of the raw material powder (barium titanate powder or barium titanate powder containing calcium). Note that, in Table 1, Sample Nos. I-2, I-7, and I-12 had added amounts of $V_2O_5$ powder, MgO powder, and $MnCO_3$ powder of 0 mol. Sample Nos. I-3, I-8, and I-13 had added amounts of MgO powder and $MnCO_3$ powder of 0 mol. Sample Nos. I-4, I-9, and I-14 had added amounts of $V_2O_5$ powder of 0 mol. Furthermore, regarding the sample in which the BT and the BCT were mixed, for example, No. I-11 is a sample in which 90 mol % of the BT powder and 10 mol % of the BCT powder were mixed.

Next, the obtained dielectric powder was added to a polyvinyl butyral resin and a mixed solvent of toluene and alcohol, and a ceramic slurry was prepared by wet-mixing using zirconia beads having a diameter of 1 mm. Then, a ceramic green sheet having a thickness of 2 μm was produced by the doctor blade method.

Next, a conductive paste containing Ni as the main component was formed for a plurality of times on the upper surface of the ceramic green sheets to form rectangular internal electrode patterns. For the conductive paste to form an internal electrode pattern, a conductive paste in which the BT powder was added to 100 parts by mass of Ni powder having the average particle size of 0.3 μm was used.

Next, 200 sheets of ceramic green sheets on which the internal electrode pattern was printed were stacked, and on the top and bottom faces thereof, 20 sheets each of ceramic green sheets on which the internal electrode pattern was not printed were stacked. The stacked sheets were then adhered each other using a pressing machine in a condition at a temperature of 60° C. and at a pressure of $10^7$ Pa, for 10 minutes to produce a laminate. Thereafter, this laminate was cut into a predetermined size to form a capacitor body compact.

Thereafter, after the green compact to be the capacitor body was subjected to binder removal treatment in the atmosphere, firing was performed in hydrogen-nitrogen by setting the temperature elevation rate to 2000° C./h and the maximum temperature to 1200° C. to produce the capacitor body 1. For this firing, a roller hearth kiln was used. As a comparative example, a sample obtained by setting the temperature elevation rate to 500° C./h was produced (Sample No. I-1).

The produced capacitor body was then subjected to reoxidation treatment by setting the maximum temperature to 1000° C., retention time to 5 hours, in a nitrogen atmosphere. The size of this capacitor body was 2.05 mm×1.28 mm×1.28 mm, the thickness of the dielectric layer 5 was 1.5 μm, the thickness of the internal electrode layer 7 was approximately 1 μm, and the effective area of one layer of the internal electrode layer 7 was 1.78 mm². Note that the effective area refers to the area of a part where the internal electrode layers overlap each other, the internal electrode layers being formed alternately in a lamination direction such that each of the internal electrode layer is exposed on different end surface of the capacitor body.

After the capacitor body was subjected to barrel polishing, an external electrode paste containing Cu powder and glass was then applied on the both end portions of the capacitor body, and sintering was performed at 850° C. to form external electrodes. Thereafter, the surface of the external electrodes was successively subjected to Ni plating and Sn plating using an electrolytic barrel machine, thereby producing a multilayer capacitor.

These capacitors were evaluated as follows. The relative permittivity at room temperature (25° C.) was determined from the thickness of the dielectric layer and the effective area of the internal electrode layer and by measuring the electrostatic capacitance at a temperature of 25° C. with a frequency of 1.0 kHz and an AC voltage of 1.0 V/μm using an LCR meter (available from Hewlett-Packard Company). The temperature characteristics of the electrostatic capacitance were measured for electrostatic capacitance in a range of −55 to 85° C. In Table 1, the amount of maximum change relative to the electrostatic capacitance at room temperature (25° C.) was shown.

Furthermore, as the evaluation of insulation reliability, a high-temperature load life test (temperature: 150° C.; 10 V) was performed, and simultaneously, the insulation resistance in the initial stage (after 1 hour) of the high-temperature load life test was measured using an insulation-resistance tester.

The high-temperature load life was determined at the time when the insulation resistance became $1 \times 10^6 \Omega$ or less.

Furthermore, the proportion of good quality product was determined by measuring withstand voltage. A sample that maintained the insulation resistance of $1 \times 10^7 \Omega$ or greater even when a voltage (30 V) of three times the rated voltage (9.6 V) was applied was determined to be the good quality product. The number of samples used for the measurement was 100 of each.

The average particle size of the crystal particles constituting the dielectric layer was determined as follows: a photograph of internal structure was taken using a scanning electron microscope after a cutout surface of a sample, which was the capacitor body after the firing, was polished; a circle by which 30 particles of the crystal particles were included was drawn on the photograph; crystal particles that were in the circle or on the circumference of the circle were selected for image treatment of contour of each of the crystal particles; the area of each of the particles was determined to calculate a diameter of a circle that had the same area; and the average value of these was determined. All the average particle sizes of the crystal particles in the produced samples were 0.25 μm, except that Sample Nos. 1 and 6 which were comparative examples had the average particle sizes of 0.3 μm. In the sample obtained by mixing the BT and the BCT, the average particle size of the crystal particles that contain calcium and are formed from the BCT was approximately 1.1 times greater than the average particle size of the crystal particles that contain no calcium and are formed from the BT.

The proportion of the crystal particles containing calcium was determined by an analyzer attached to a transmission electron microscope. In this case, the observed region was a region having approximately 50 particles of the crystal particles in the cross-section of the dielectric layer. Furthermore, the crystal particles containing no calcium were crystal particles having the calcium concentration of 0.1 at. % or less. On the other hand, the crystal particles containing calcium were identified as crystal particles having the calcium concentration of 0.4 at. % or greater. Thereafter, the proportion of the area of the crystal particles containing calcium was determined while the total area of all the observed crystal particles (50 particles) was assigned a value of 1. The proportion of the area of the crystal particles containing calcium was approximately 1.1 times greater than that of the mixed composition.

The crystal structure of the crystal particle was identified by grinding the produced multilayer ceramic capacitor and by using the X-ray diffraction method. Regions of plane indices (002, 020, 200) were evaluated by the X-ray diffraction using a Kα-ray of Cu. All of the produced samples had a diffraction peak of (020) between diffraction peaks of (002) and (200), and the tetragonal system and the cubic system coexisted.

Furthermore, the change in the concentration of elements in the crystal particle was determined using a transmission electron microscope and an analyzer attached to the transmission electron microscope. The transmission electron micrograph and a graph of the change in concentration of each element shown in FIGS. 2A and 2B are analysis results for Sample No. I-5. Sample Nos. I-2 to I-4 also exhibited similar changes in the concentrations. The change in the concentration of the rare earth element of the sample No. I-1 corresponded to the curve B in FIG. 2B. The results are shown in Table 1.

TABLE 1

| Sample No. | Presence/absence of low concentration region in particle boundary vicinity | Presence/absence of localized vanadium in low concentration region | Presence/absence of localized manganese and magnesium in low concentration region | Main raw material |
|---|---|---|---|---|
| I-1 | Absent | Absent | Present | BT |
| I-2 | Present | Absent | Absent | BT |
| I-3 | Present | Present | Absent | BT |
| I-4 | Present | Absent | Present | BT |
| I-5 | Present | Present | Present | BT |
| I-6 | Absent | Absent | Present | BCT |
| I-7 | Present | Absent | Absent | BCT |
| I-8 | Present | Present | Absent | BCT |
| I-9 | Present | Absent | Present | BCT |
| I-10 | Present | Present | Present | BCT |
| I-11 | Present | Present | Present | BT/BCT(90/10) |
| I-12 | Present | Present | Present | BT/BCT(70/30) |
| I-13 | Present | Present | Present | BT/BCT(50/50) |
| I-14 | Present | Present | Present | BT/BCT(30/70) |
| I-15 | Present | Present | Present | BT/BCT(10/90) |

| Sample No. | Relative permittivity — | Temperature characteristic of relative permittivity % | Dielectric loss % | High-temperature load life h | Insulation resistance ($\times 10^8$) Ω | Proportion of good quality product of withstand voltage Number |
|---|---|---|---|---|---|---|
| I-1 | 3800 | −14 | 6.0 | 11 | 2.8 | 25 |
| I-2 | 4400 | −14 | 9.5 | 8 | 2.1 | 32 |
| I-3 | 4200 | −22 | 8.5 | 15 | 1.5 | 33 |
| I-4 | 4300 | −15 | 9.0 | 9 | 3.3 | 36 |
| I-5 | 4500 | −14 | 10.0 | 16 | 1.5 | 55 |

TABLE 1-continued

| | | | | | | |
|---|---|---|---|---|---|---|
| I-6  | 4000 | −14 | 6.1  | 16 | 2.8 | 25 |
| I-7  | 4600 | −14 | 9.9  | 13 | 2.1 | 32 |
| I-8  | 4400 | −22 | 9.0  | 20 | 1.5 | 33 |
| I-9  | 4500 | −15 | 10.0 | 14 | 3.3 | 36 |
| I-10 | 4700 | −14 | 11.2 | 21 | 1.5 | 55 |
| I-11 | 4510 | −14 | 10.2 | 21 | 1.5 | 55 |
| I-12 | 4550 | −14 | 10.4 | 21 | 1.5 | 55 |
| I-13 | 4600 | −14 | 10.6 | 21 | 1.4 | 54 |
| I-14 | 4650 | −14 | 10.9 | 21 | 1.5 | 55 |
| I-15 | 4680 | −14 | 11.1 | 21 | 1.5 | 55 |

As is clear from the results of Table 1, the samples having the low concentration region of the rare earth element in the particle boundary vicinity of the crystal particle (Sample Nos. I-2 to I-5) achieved higher relative permittivities compared to the relative permittivity of the sample having no low concentration region of rare earth element in the particle boundary vicinity of the crystal particle (Sample No. I-1).

The samples that had the condition where vanadium was localized in the low concentration region of the rare earth element (Sample Nos. I-3 and I-5) had the high-temperature load lives of 15 hours or longer although the insulation resistances were reduced.

The samples that had the condition where magnesium and manganese were localized in the low concentration region of the rare earth element (Sample Nos. I-4 and I-5) had the maximum values of change in the relative permittivity of −15% or less.

Furthermore, Sample No. I-5 had a higher proportion of good quality product in the withstand voltage test compared to the case of other samples (Sample Nos. I-1 to I-4).

Furthermore, the samples having the dielectric layer formed from the crystal particles containing calcium (Sample Nos. I-7 to I-10) achieved higher relative permittivities compared to the relative permittivity of the sample having no low concentration region of rare earth element in the particle boundary vicinity of the crystal particle (Sample No. I-6).

Example 2

Hereinafter, evaluations of dielectric characteristics were performed by specifically producing a capacitor of the second embodiment. First, as the raw material powder, a barium titanate powder having a purity of 99.9%, the range of particle size distribution of 0.05 to 0.2 μm, the average particle size (D50) of 0.09 μm, and a molar ratio of Ba/Ti of 1.005 (shown as BT in Table 1) and a barium titanate powder containing 0.5 at. % of calcium and having a molar ratio of (Ba+Ca)/Ti of 1.005 (shown as BCT in Table 1) were prepared. The dielectric powder was prepared by adding the following components to the raw material powder. The composition of the dielectric powder contained, per 100 mol of the barium titanate powder (or, barium titanate powder containing calcium), 0.05 mol of $V_2O_5$ powder, 0.7 mol of MgO powder, 0.4 mol of oxide powder of rare earth element ($Dy_2O_3$), and 0.2 mol of $MnCO_3$ powder, and 1 part by mass of a sintering aid (glass powder having the following composition: $SiO_2$=55, BaO=20, CaO=15, $Li_2O$=10 (mol %)) was added to 100 parts by mass of the barium titanate powder.

Next, the obtained dielectric powder was added to a polyvinyl butyral resin and a mixed solvent of toluene and alcohol, and a ceramic slurry was prepared by wet-mixing using zirconia beads having a diameter of 1 mm. Then, a ceramic green sheet having a thickness of 2 μm was produced by the doctor blade method.

Next, a conductive paste containing Ni as the main component was formed for a plurality of times on the upper surface of the ceramic green sheets to form rectangular internal electrode patterns. For the conductive paste to form an internal electrode pattern, a conductive paste in which the BT powder was added to 100 parts by mass of Ni powder having the average particle size of 0.3 μm was used.

Next, 200 sheets of ceramic green sheets on which the internal electrode pattern was printed were stacked, and on the top and bottom faces thereof, 20 sheets each of ceramic green sheets on which the internal electrode pattern was not printed were stacked. The stacked sheets were then adhered each other by using a pressing machine in a condition at a temperature of 60° C. and at a pressure of $10^7$ Pa, for 10 minutes to produce a laminate. Thereafter, this laminate was cut into a predetermined size to form a capacitor body compact.

Thereafter, after the green compact to be the capacitor body was subjected to binder removal treatment in the atmosphere, firing was performed in hydrogen-nitrogen by varying the temperature elevation rate in a range of 300° C./h to 10000° C./h and by setting the maximum temperature to 1200° C. For this firing, a roller hearth kiln was used.

The produced capacitor body was then subjected to reoxidation treatment by setting the maximum temperature to 1000° C., retention time to 5 hours, in a nitrogen atmosphere. The size of this capacitor body was 2.05 mm×1.28 mm×1.28 mm, the thickness of the dielectric layer was 1.5 μm, the thickness of the internal electrode layer was approximately 1 μm, and the effective area of one layer of the internal electrode layer was 1.78 $mm^2$. Note that the effective area refers to the area of a part where the internal electrode layers overlap each other, the internal electrode layers being formed alternately in a lamination direction so that each of the internal electrode layer is exposed on different end surface of the capacitor body.

After the capacitor body was subjected to barrel polishing, an external electrode paste containing Cu powder and glass was then applied on the both end portions of the capacitor body, and sintering was performed at 850° C. to form external electrodes. Thereafter, the surface of the external electrodes was successively subjected to Ni plating and Sn plating using an electrolytic barrel machine, thereby producing a capacitor.

These capacitors were evaluated as follows. The electrostatic capacitance at room temperature (25° C.) was measured at a temperature of 25° C. with a frequency of 1.0 kHz and an AC voltage of 1.0 V/μm using an LCR meter (available from Hewlett-Packard Company).

Furthermore, as the evaluation of insulating property, a high-temperature load life test (temperature: 150° C.; 10 V) was performed, and simultaneously, the insulation resistance in the initial stage (after 1 hour) of the high-temperature load life test was measured using an insulation-resistance tester. The high-temperature load life was determined at the time when the insulation resistance became $10^6 \Omega$ or less.

Furthermore, DC bias characteristic was determined by applying a direct-current voltage of 2 V to the capacitor, measuring the electrostatic capacitance and the dielectric loss, and determining the proportion relative to the value obtained by measurement in a condition where the direct-current voltage was not applied. The number of samples of each of these measurements was 10.

Note that, in Table 2, as the evaluation of performances of the capacitor, a value obtained by multiplying the values of insulation resistance, high-temperature load life, and electrostatic capacitance (performance index 1 of Table 2) and a value obtained by further multiplying this value by DC bias characteristic (electrostatic capacitance and dielectric loss) (performance index 2 of Table 2) were shown as indexes.

The following method was used to select the first crystal particles and the second crystal particles from the dielectric layer. First, a polished surface obtained by polishing a cross-section of the dielectric layer of the capacitor was produced, and a photograph was taken using a transmission electron microscope (magnification: 5000 to 100000 times). Regarding the concentration of vanadium in the crystal particle, elemental analysis of the crystal particle present in the polished surface of the sample described above was performed using a transmission electron microscope equipped with an elemental analysis device. At this time, the spot size of the electron beam was from 2 to 3 nm due to the performance of the device. The positions that are subjected to the analysis were 4 to 5 positions chosen on a straight line from the side of the grain boundary, the straight line being drawn from the grain boundary to the center of each crystal particle. Thereafter, the concentration of vanadium detected from each measurement point was determined and plotted as shown in FIG. 4B. This analysis was performed for 30 particles of each of the samples to determine the first crystal particles and the second crystal particles from the change in concentration of vanadium, and the proportion was determined in terms of the proportion of the number. Among the produced samples, in Sample Nos. II-2 to II-4 and II-7 to II-9, the concentration of the rare earth element was at a minimum in the maximum concentration region of vanadium, and magnesium and manganese were at a maximum at the surface of the crystal particle.

TABLE 2

| Sample No. | Raw material powder | Temperature elevation in firing (° C./hr) | First crystal particle N1/(N1 + N2) | Second crystal particle N2/(N1 + N2) | Insulation resistance (Z) (MΩ) | High-temperature load life (MTTF) (M) (hr) | Electrostatic capacitance (C1) (uF) |
|---|---|---|---|---|---|---|---|
| II-1 | BT | 10000 | 1 | 0 | 2003 | 2.55 | 10.1 |
| II-2 | BT | 8000 | 0.7 | 0.3 | 1116 | 7.79 | 10.2 |
| II-3 | BT | 6000 | 0.5 | 0.5 | 1078 | 12.71 | 10.1 |
| II-4 | BT | 1500 | 0.2 | 0.8 | 360 | 39.32 | 10.2 |
| II-5 | BT | 300 | 0 | 1 | 31 | 53.24 | 10.1 |
| II-6 | BCT | 10000 | 1 | 0 | 2014 | 3.55 | 11 |
| II-7 | BCT | 8000 | 0.7 | 0.3 | 1130 | 9.79 | 11.2 |
| II-8 | BCT | 6000 | 0.5 | 0.5 | 1090 | 16.71 | 11.1 |
| II-9 | BCT | 1500 | 0.2 | 0.8 | 370 | 59.32 | 11.2 |
| II-10 | BCT | 300 | 0 | 1 | 40 | 73.24 | 11.1 |

| Sample No. | Dielectric loss % | DC bias characteristic Electrostatic capacitance (DC) % | DC bias characteristic Dielectric loss (DF) % | Performance index 1 (Z*M*C1) | Performance index 2 (Z*M*C1*DC*DF) |
|---|---|---|---|---|---|
| II-1 | 7.6 | 28 | 43 | 5.E+04 | 6.E+07 |
| II-2 | 7.5 | 41 | 55 | 9.E+04 | 2.E+08 |
| II-3 | 7.6 | 43 | 61 | 1.E+05 | 4.E+08 |
| II-4 | 7.6 | 49 | 63 | 1.E+05 | 4.E+08 |
| II-5 | 7.4 | 51 | 65 | 2.E+04 | 6.E+07 |
| II-6 | 7.8 | 29 | 44 | 8.E+04 | 1.E+08 |
| II-7 | 7.7 | 43 | 56 | 1.E+05 | 3.E+08 |
| II-8 | 7.8 | 44 | 63 | 2.E+05 | 6.E+08 |
| II-9 | 7.8 | 50 | 64 | 2.E+05 | 8.E+08 |
| II-10 | 7.5 | 52 | 65 | 3.E+04 | 1.E+08 |

As is clear from the results in Table 2, the samples (Sample Nos. II-2 to II-4), in which the first crystal particles and the second crystal particles having different changes in concentrations of vanadium coexisted in the dielectric layer, had higher performance indexes compared to those of the samples (Sample Nos. II-1 and II-5) that contained either one of the first crystal particles or the second crystal particles.

Furthermore, the samples (Sample Nos. II-6 to II-10), in which the dielectric layer was produced using the BCT powder, were subjected to the similar evaluation as described above. Also in these cases, similar tendencies were exhibited as those of the cases of Sample Nos. 1 to 5. The performance indexes were large in a range where the ratio, N2/N1+N2, was from 0.3 to 0.8 (Sample Nos. 7 to 9).

REFERENCE SIGNS LIST

1 Capacitor body
3 External electrode

5 Dielectric layer
7 Internal electrode layer
9, 19 Crystal particle
9A, 19A First crystal particle
9B, 19B Second crystal particle
9a, 19a Particle boundary vicinity (of crystal particle)
9b, 19b Inside (of crystal particle)
11, 21 Grain boundary
12 Low concentration region
19s Surface (of crystal particle)

The invention claimed is:

1. A capacitor comprising:
a plurality of dielectric layers that are each formed from a dielectric porcelain, wherein the dielectric porcelain contains barium titanate and a rare earth element;
a plurality of internal electrode layers;
a capacitor body that includes alternating layers of the plurality of dielectric layers and the plurality of internal electrode layers; and
an external electrode that is electrically coupled to the plurality of internal electrode layers and provided on an end surface of the capacitor body, wherein the end surface of the capacitor body is orthogonal to a direction of the alternating layers; wherein
the dielectric porcelain contains the crystal particles that have a low concentration region and a high concentration that is inward from the low concentration region, wherein the low concentration region is 10 nm to 60 nm inward from a surface of the crystal particles and the low concentration region contains a concentration of the rare earth element that is lower than a concentration of the rare earth element in the high concentration region.

2. The capacitor according to claim 1, wherein the crystal particles further contain vanadium, and the low concentration region contains a larger amount of the vanadium compared to the high concentration region.

3. The capacitor according to claim 2, wherein the crystal particle is formed from:
a first crystal particle in which the concentration of the vanadium is at a maximum at the surface of the crystal particle, and
a second crystal particle having a maximum concentration region in which the concentration of the vanadium is at a maximum in a particle boundary vicinity that is on an inner side from the surface of the crystal particle.

4. The capacitor according to claim 3, wherein, when a number of the first crystal particle observed on a polished surface of the dielectric porcelain is N1 and a number of the second crystal particle is N2, $N2/(N1+N2)$ is from 0.3 to 0.8.

5. The capacitor according to claim 3, wherein a concentration of the rare earth element contained in the second crystal particle is at a minimum in the maximum concentration region of the vanadium.

6. The capacitor according to claim 1, wherein the crystal particle further contains magnesium and manganese, and the magnesium and the manganese have a concentration gradient that is at a maximum closest to the surface and lowers toward the high concentration region.

7. The capacitor according to claim 1, wherein the crystal particle contains calcium.

8. The capacitor according to claim 1, wherein the concentration of the rare earth element increases gradually between 40 nm to 80 nm inward from the surface of the crystal particles.

* * * * *